Sept. 25, 1956 R. T. ADAMS ET AL 2,764,237
APPARATUS FOR ENGAGING ARTICLES
MOVING ON A ROTATING TURRET
Original Filed Jan. 11, 1945 7 Sheets-Sheet 1
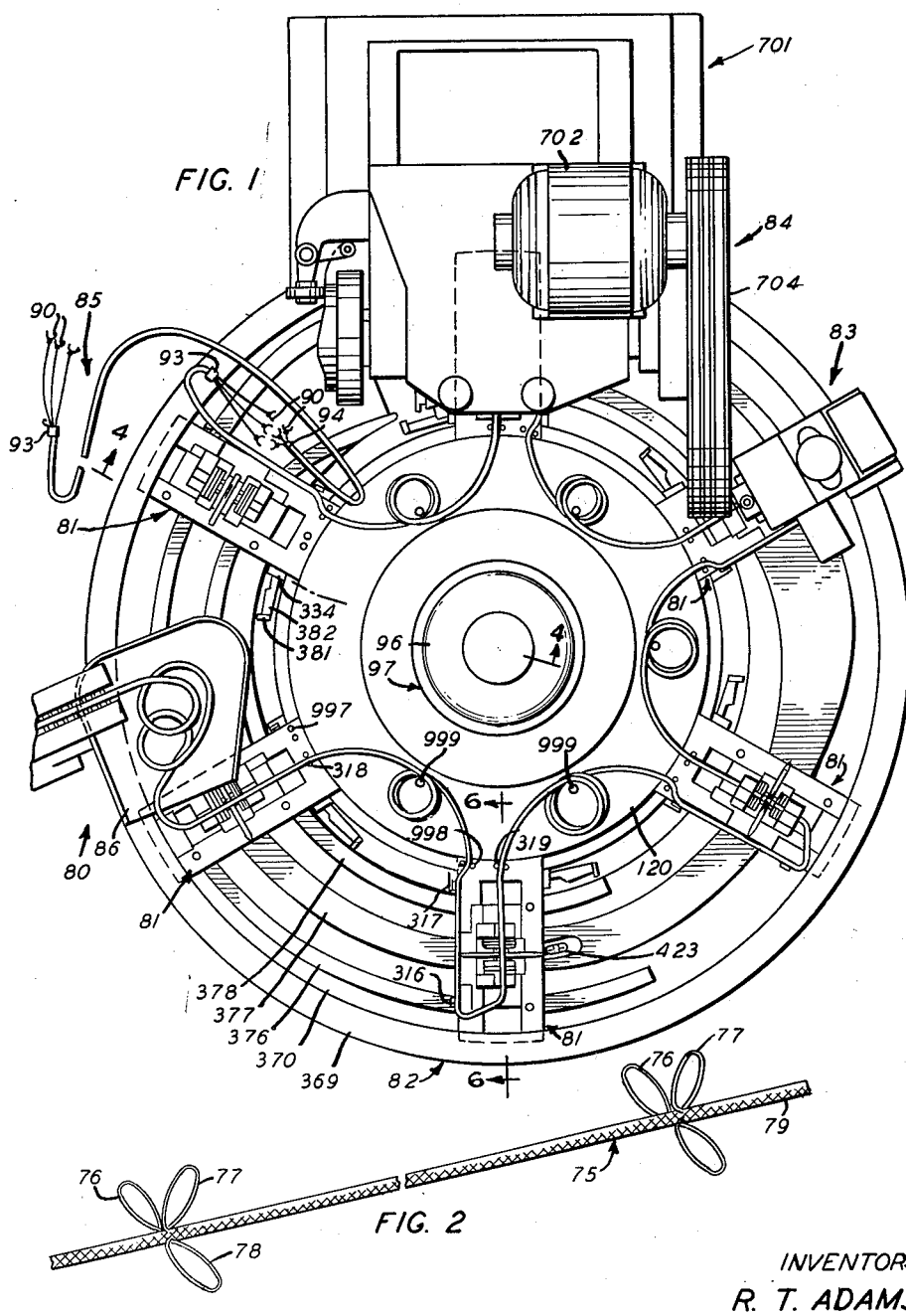
INVENTORS
R. T. ADAMS
J. A. WAGNER
BY [signature]
ATTORNEY

INVENTORS
R. T. ADAMS
J. A. WAGNER
BY
ATTORNEY

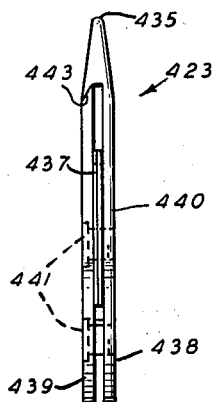
FIG. 12
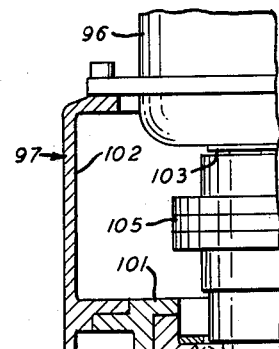
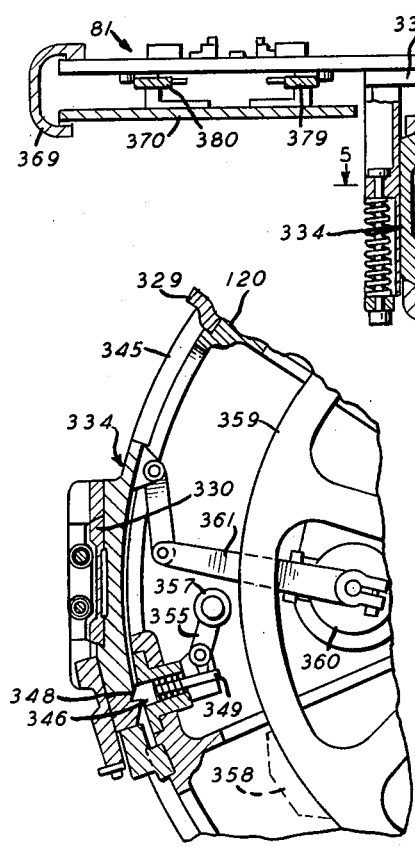
FIG. 4
FIG. 5

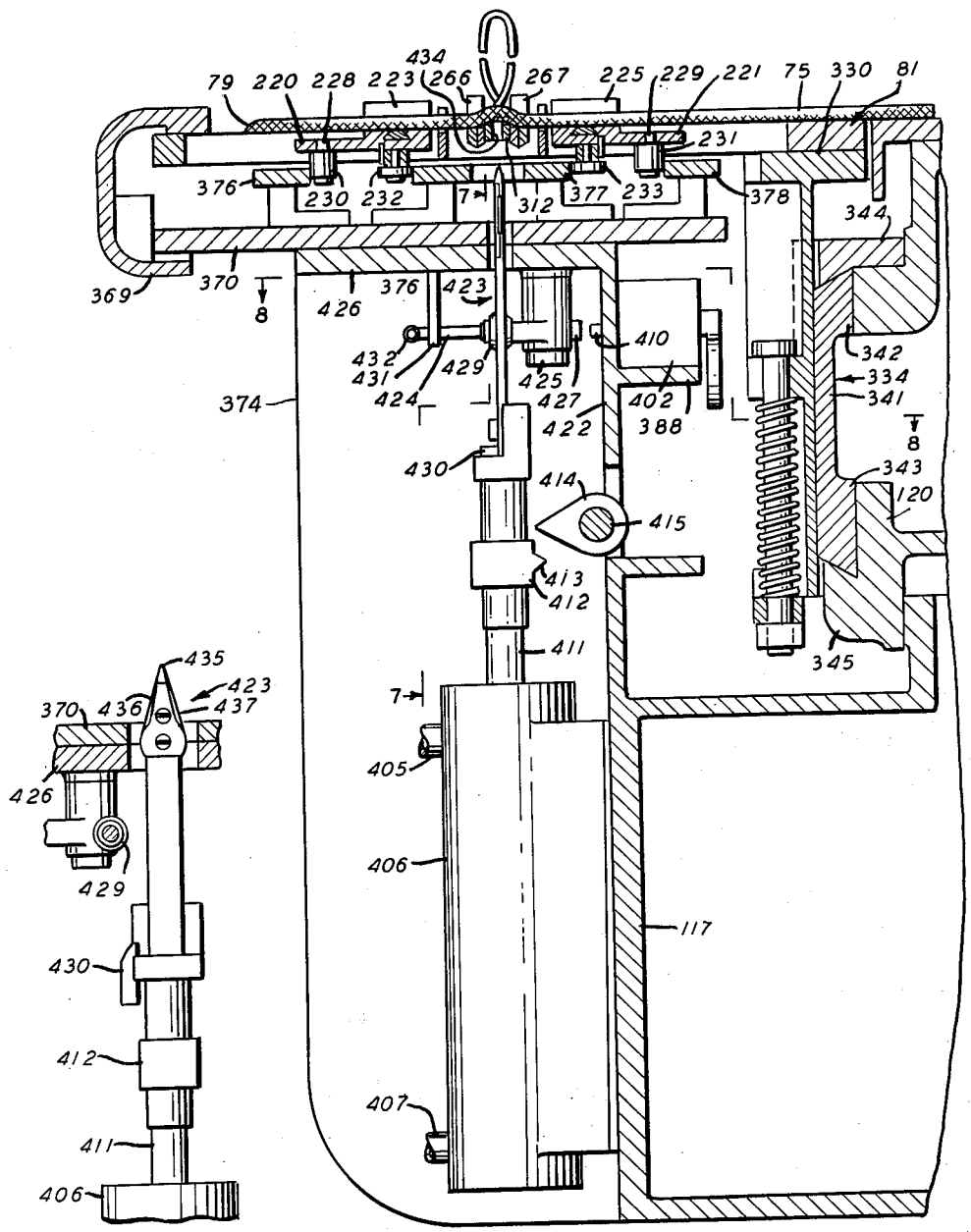

INVENTORS
R. T. ADAMS
J. A. WAGNER

Sept. 25, 1956 R. T. ADAMS ET AL 2,764,237
APPARATUS FOR ENGAGING ARTICLES
MOVING ON A ROTATING TURRET
Original Filed Jan. 11, 1945 7 Sheets-Sheet 6
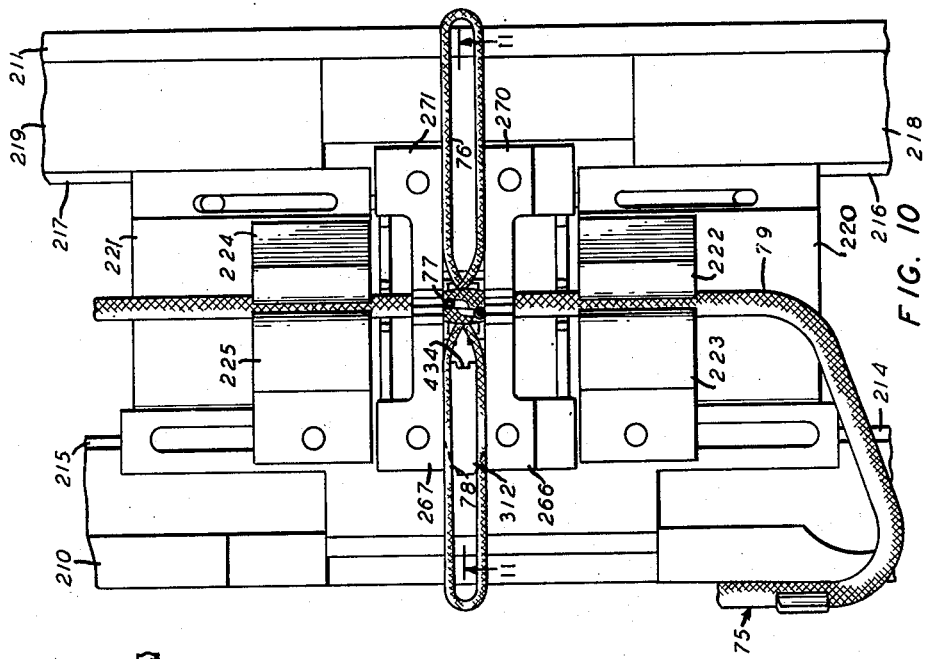
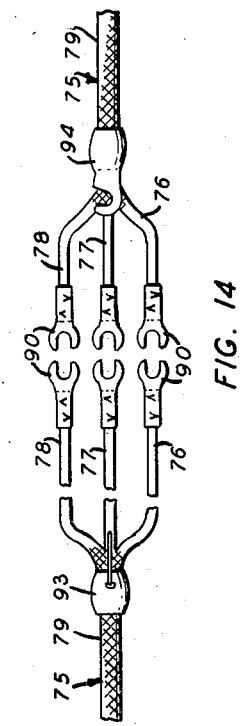
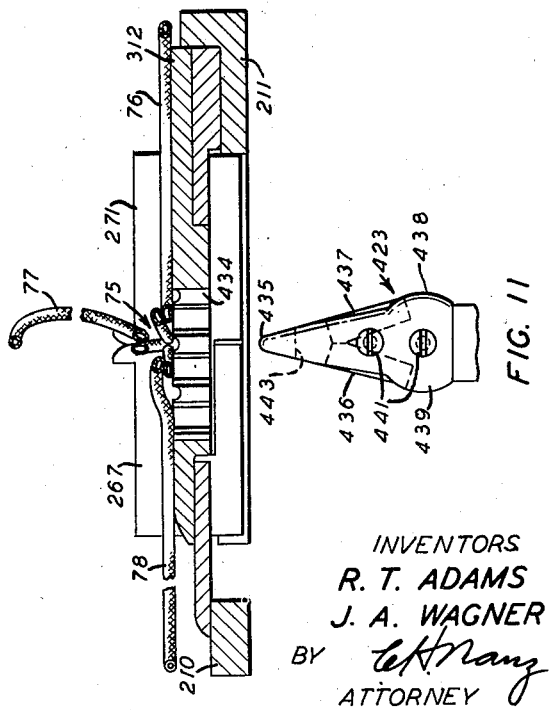
INVENTORS
R. T. ADAMS
J. A. WAGNER
BY
ATTORNEY

INVENTORS
R. T. ADAMS
J. A. WAGNER
ATTORNEY

United States Patent Office 2,764,237
Patented Sept. 25, 1956

2,764,237

APPARATUS FOR ENGAGING ARTICLES MOVING ON A ROTATING TURRET

Robert T. Adams, Short Hills, N. J., and Julius A. Wagner, Chicago Heights, Ill., assignors to Western Electric Company, Incorporated, New York, N. Y., a corporation of New York Application February 24, 1947, Serial No. 730,512, now Patent No. 2,613,427, dated October 14, 1952, which is a continuation of application Serial No. 572,414, January 11, 1945. Divided and this application August 16, 1952, Serial No. 304,734

10 Claims. (Cl. 164—48)

This invention relates to article engaging apparatus and particularly to apparatus for engaging and cutting the coverings on braided cordage to facilitate forming multiconductor, double-ended cords from the cordage.

This application is a division of our copending application Serial No. 730,512, filed February 24, 1947 as a continuation of our application Serial No. 572,414, filed January 11, 1945, now abandoned. Application Serial No. 730,512 has matured into Patent 2,613,427.

In the telephone and like industries, large numbers of multiconductor cords are used for interconnecting cooperating pieces of electrical apparatus. In the manufacture of these cords, it has been found desirable to braid a continuous covering over a plurality of individually insulated conductors and at measured intervals along the resulting cordage to form loops in the conductors which extend through the braided covering. This operation is performed in the braiding of the cordage and, when the cordage is formed in this manner, it is not necessary to strip off the braided covering in forming short double-ended cords. By severing the braided covering, the lengths of individually insulated conductors which have been thrown out or pulled through the braid may have terminal members attached to them and may be trimmed to the desired lengths.

It is an object of the present invention to provide novel and efficient article engaging apparatus.

Another object of the invention is to provide new and improved apparatus for engaging and cutting the coverings on braided cordage to facilitate forming multiconductor, double-ended cords from the cordage.

In accordance with one embodiment of the invention, cordage which has had the conductors looped or thrown out at intervals through its braided covering is fed from a suitable supply thereof to an article severing apparatus, which includes a pedestal on which a series of cordage positioning plates are carried in a circular path to present the plates sequentially to a mechanism for cutting the braided covering at the point where the loops of individually insulated conductors are thrown out of the covering. The apparatus also may be provided with means for positioning the freed loops of the conductors to receive stay bands, S-hooks, and terminals, and for checking the positions of the conductors. Means also may be provided to apply stay bands, S-hooks, and terminals to the conductors and to sever the conductors at points adjacent to the applied terminals.

A complete understanding of the invention may be had by reference to the following detailed description, when considered in conjunction with the accompanying drawings, wherein:

Fig. 1 is a plan view, partly broken away, of an apparatus embodying the invention;

Fig. 2 is a perspective view of a length of cordage supplied to the machine and showing the individually insulated conductors thrown out of the cordage at spaced intervals;

Fig. 4 is a vertical section taken substantially along line 4—4 of Fig. 1;

Fig. 5 is a fragmentary horizontal section taken substantially along line 5—5 of Fig. 4;

Fig. 6 is a vertical section taken substantially along line 6—6 of Fig. 1;

Fig. 7 is a fragmentary vertical section taken substantially along line 7—7 of Fig. 6;

Fig. 10 is a fragmentary top plan view on an enlarged scale looking down at the top of the cordage-positioning plate with a length of cordage mounted in it prior to the operation of the braid-cutting mechanism on the cordage, one of the conductors being cut away;

Fig. 11 is a fragmentary vertical section taken along line 11—11 of Fig. 10 and showing the arrangement of the various parts of the cordage-positioning plate with respect to the cordage prior to the cutting of the braided covering;

Fig. 12 is a fragmentary side view of the braid-severing knife shown in Fig. 11;

Fig. 14 is a detail view of the adjoining ends of two cords, to which stay bands, S-hooks and terminals have been attached in the apparatus.

Figure 3:
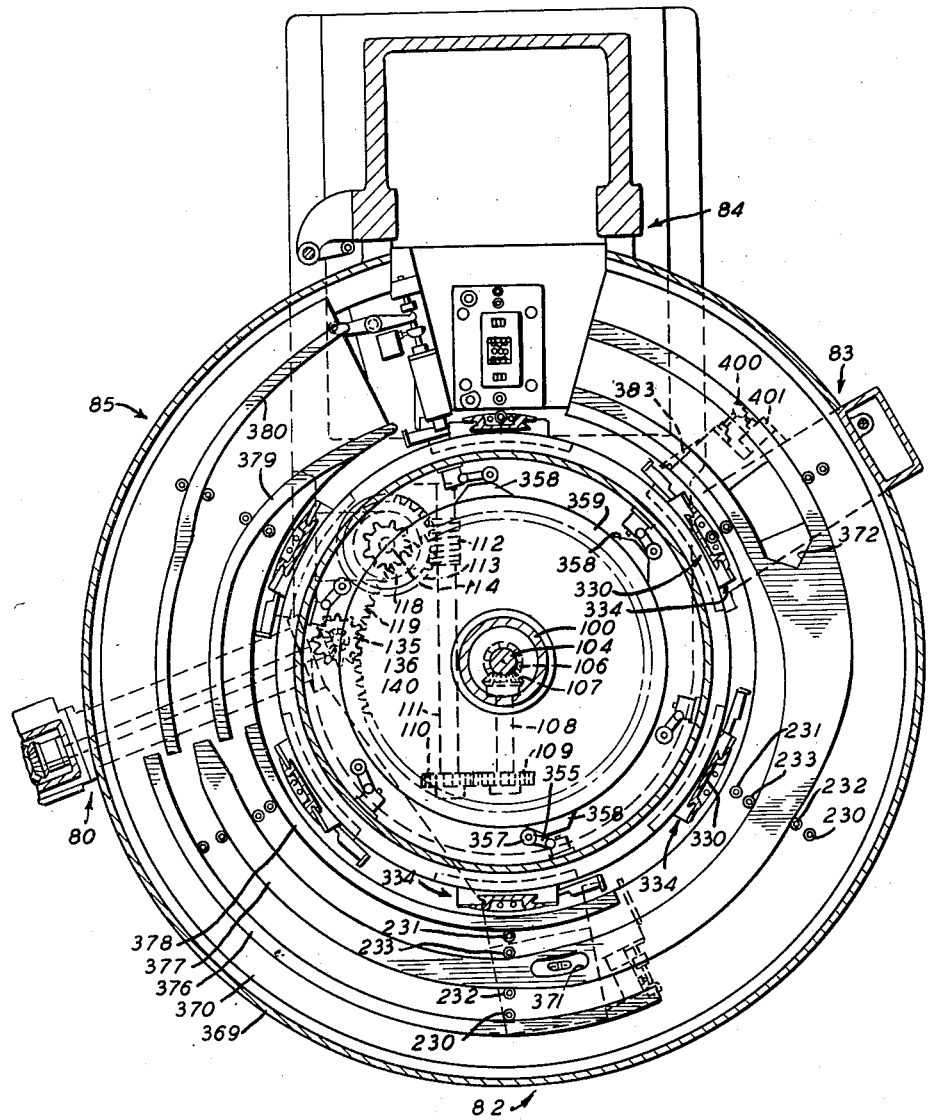
Fig. 3 is a horizontal section taken through the apparatus at a point just below the cordage-positioning plates.

The apparatus of the preferred embodiment of the invention is designed to process cordage 75 (Fig. 2), which comprises three separately insulated conductors 76, 77 and 78 having a common braided covering 79 thereon, as shown most clearly in Figs. 6 and 10. The braided covering 79 encloses the three individually insulated conductors throughout most of the length of the cordage, but the three insulated conductors 76, 77 and 78 extend out through the braided covering 79 at predetermined intervals, which intervals determine the length of the cords to be formed. The amount that the individual conductors 76, 77 and 78 are drawn through the braid, in the process of applying the braid on the conductors, will determine the length of the conductors extending out at the ends of the braided cords after the braided covering has been severed at the point where the conductors extend from it and after the conductors have each been cut.

The braided cordage is fed to the mechanism for cutting the braided covering at the point where the conductors extend from it by a feeding mechanism, designated generally by the numeral 80 (Fig. 1). This feeding mechanism operates in timed relation to the remainder of the apparatus, and the cordage, as it is fed to the rest of the processing mechanism, may be positioned on one of a plurality of cordage-positioning plates 81, there being six cordage-positioning plates provided in the apparatus. These plates are suitably supported, as will be described hereinafter, to travel in a circular path, which will carry them to a braid-severing station 82, a tucking and inspection station 83, a punch press station 84, and an unloading station 85.

At the feeding mechanism 80, the cordage will be fed onto a suitable platform 86, from which an operator may remove a section of cordage and place it on a cordage-positioning plate 81, moving past the feeding mechanism, with the cordage so positioned that the loops of individually insulated conductors 76, 77 and 78 extending out from it will be located in a predetermined position on the plate, as will be described more in detail hereinafter. The plate 81, in the operation of the apparatus, will be carried around to the braid-severing station 82, where the braided covering 79 will be cut at the point at which the conductors 76, 77 and 78 extend through it. In travelling in its circular path, the plate will next arrive at the tucking and inspection station 83 and, in travelling to this station, the severed ends of the braid 79 will be moved apart slightly so that when the cordage-positioning plate 81 arrives at the tucking and inspection station, a mechanism may be brought into operation to tuck the surplus portions of the individual conductors down through the plate 81 and locate the individual conductors in proper position to receive terminals 90 to each of the conductors 76, 77 and 78, and also to inspect the cordage to determine whether the individual conductors are properly positioned on the positioning plate.

Each of the individual conductors 76, 77 and 78 has two terminals 90 (Fig. 14) attached to it in the punch press station 84. Thereafter, in the same operation, each of the conductors 76, 77 and 78 has a section cut from it in the position between the formed terminals 90. The terminals 90 are fed to the punch press mechanism in strip form, and all of the terminals in the strip are interconnected. In the punch press mechanism, however, the mechanism provided, in addition to attaching the terminals 90 to the conductors 76, 77 and 78, also cuts the terminal apart so that when the cordage-positioning plates 81 move out of the punch press, the terminals will be separated one from another and will be attached to their respective conductors. At the punch press station 84, S-hooks 93 partially formed and interconnected in a strip are cut from their strip and attached to the cordage to form a supporting means. Similarly, stay bands 94 interconnected in a strip and partially formed are fed into the punch press, cut from their strip and attached to the cordage 75. The S-hooks 93 and stay bands 94 serve to support the cords in position in electrical apparatus without applying tension to the individual conductors and, in addition, serve to prevent unravelling of the braided covering 79 from the cords. After the operations on the cordage 75 have been performed at the punch press station, the plates 81 will move up out of the punch press station to the unloading station 85, where the completed cords may be stripped from the plates.

The driving mechanism

The main driving mechanism for the apparatus comprises, as shown most clearly in Figs. 1, 3 and 4, a motor 96 (Figs. 1 and 4) mounted upon the upper end of a housing assembly 97. The housing assembly 97 comprises a main supporting base 98 (Fig. 4) for supporting a main base casting 99. Suitably supported on the main base casting 99 is a tubular bearing member 100, which extends up through the center of the apparatus and has an annular support ring 101 positioned at its upper surface for carrying an annular motor supporting casing 102. The motor 96 is carried by the casing 102 in position to direct its drive shaft 103 vertically downwardly. The drive shaft 103 is coupled to a main shaft 104 by a suitable coupling member 105, which is, in turn, suitably journalled within the tubular bearing member 100.

Fixed to the lower end of the main shaft 104 is a beveled pinion 106, which, as shown in dotted lines in Fig. 3, meshes with a beveled pinion 107 attached to a stud shaft 108 which is, in turn, suitably supported on the main base casting 99. The shaft 108 carries at its outer end a pinion 109 meshing with a pinion 110 on a worm shaft 111, which is also suitably supported on the main base casting 99. The worm shaft 111 carries a worm 112 in mesh with a worm gear 113 (Figs. 3 and 4). The worm gear 113 is disposed in a horizontal plane and is fixed to a short shaft 114. The shaft 114 is journalled in suitable bearings 115 and 116 mounted upon a cylindrical casing member 117, which is supported by the main base casting 99. At its upper end, the shaft 114 carries a pinion 118 in mesh with a ring gear 119 fixed to the underside of a dial supporting casting 120. The dial supporting casting 120 encircles the tubular bearing member 100, and is rotatable about lower and upper bearing sleeves 121 and 122, being carried between a wall of bearing member 100 and a suitable thrust bearing assembly 123, which is positioned between a shoulder 124 on the bearing member 100 and a cooperating shoulder 125 formed on the casting 120. The casting 120 is of irregular configuration and serves to support the cordage-positioning plates 81 in their rotation around the apparatus.

The ring gear 119, in addition to meshing with the pinion 118, also meshes with a pinion 135 forming a part of the drive for the cordage-feeding mechanism 80. The coradge-feeding mechanism 80 is disclosed and claimed specifically in our copending application Serial No. 730,513, filed February 24, 1947, as a division of the aforementioned application Serial No. 572,414. Application Serial No. 730,513 has matured into Patent 2,613,426.

Cordage-positioning plates

The cordage-positioning plates 81, six in number, are all of exactly the same construction and serve to support the cordage 75 in position to have the braid 79 thereon cut at the point where the conductors extend through the braid. Each plate 81 also serves to properly position the cordage and individual conductors at the tucking and inspection station 83 and at the punch press station 84. In order to present the cordage to the various operating stations of the apparatus, the plates 81 move in a circular path about the axis of the main shaft 104.

Since, as pointed out hereinbefore, each of the cordage-positioning plates 81 is of the same construction, only one cordage-positioning plate will be described in detail. The cordage-positioning plate 81 comprises a framework including side members 210 and 211 (Fig. 10). The side member 210 has a pair of dovetail slots 214 and 215 formed in it adjacent its outer and inner ends, which cooperate with corresponding dovetail slots 216 and 217, formed on the side member 211 by cooperating surfaces on the side member 211 and retainer plates 218 and 219 suitably attached to the side member 211. Positioned to slide in the cooperating dovetail slots 214 and 216 is a slidable clamp-supporting plate 220, and similarly positioned to slide in the cooperating dovetail slots 215 and 217 is a second slidable clamp-supporting plate 221. The clamp-supporting plate 220 carries a main fixed clamp member 222 and a main movable clamp member 223. Similarly, the clamp-supporting plate 221 carries a main fixed clamp member 224 and a main movable clamp member 225. The main movable clamping members 223 and 225 are slidably mounted with respect to the main fixed clamping members 222 and 224, respectively, but will move with the slidable clamp-supporting plates 220 and 221 when the clamp-supporting plates move in their associated ways on the side members 210 and 211 of the positioning plate 81. Extending downwardly from the clamp-supporting plates 220 and 221 are a pair of stud shafts 228 and 229 (Fig. 6), on which are freely rotatable a pair of cam rollers 230 and 231. The cam rollers 230 and 231 cooperate with a second pair of cam rollers 232 and 233 in shifting the clamp-supporting plates 220 and 221 inwardly and outwardly on their dovetail slots 214 and 216, and 215 and 217.

The construction of the clamping mechanism and the operation thereof are described fully in the aforementioned Patent 2,613,426, to which reference is made for details thereof.

In addition to the operating parts of the cordage-positioning plate 81, a pair of clips 316 and 317 (Fig. 1) are provided at the side of each member 210 to retain the cordage along the side of the plate. In addition to these clips, the cordage extends between a pair of pins 318 and 319, in the manner illustrated most clearly in Fig. 1. If it is found necessary, additional retaining pins 997 and 998 may be provided on the cordage-positioning plate between which the operator may place the excess cordage and an additional pin 999 may be provided adjacent to each cordage-positioning plate 81 on the dial-supporting casting 120 to receive the coil of cordage 75 which has been dropped onto the platform 86.

Positioning plate arresting mechanism

Figure 8:
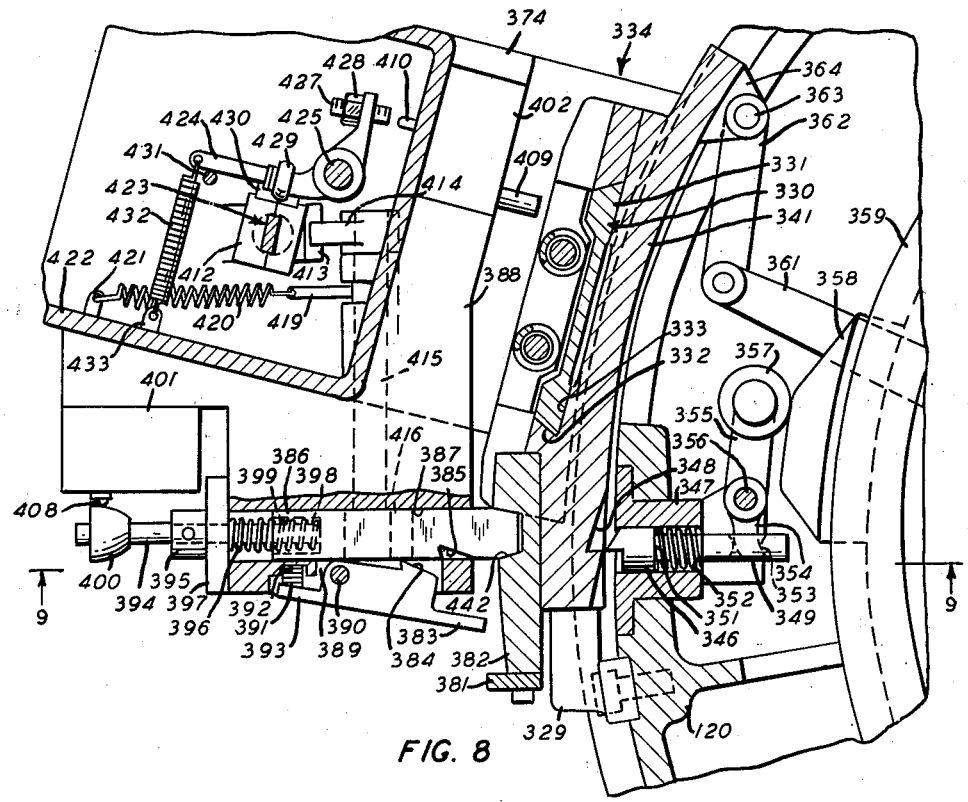
Fig. 8 is a fragmentary horizontal section taken substantially along line 8—8 of Fig. 6.

The cordage-positioning plates 81, comprising the hereinbefore described assemblage of cooperating parts, are each mounted upon a supporting bracket 330, as seen most clearly in Figs. 4, 6 and 8, of which there is provided one for each plate 81. The bracket 330 is irregular in configuration and has its sides tapered, as shown at 331 and 332 (Fig. 8) to fit into a dovetailed groove 333 on a carriage designated generally by the numeral 334.

The carriage 334 (Figs. 6 and 8) comprises an arcuately shaped portion 341 having dovetailed upper and lower portions 342 and 343, which slidably engage a cap member 344 and a shoulder 345, which cooperate to form a dovetailed slot for slidably supporting the carriage 334 for movement to a limited extent around the dial-supporting casting 120, with which the shoulder 345 is integrally formed. Each of the carriages 334 is normally latched to the dial-supporting casting 120 by means of a spring-pressed latch 346 (Fig. 8), which is seated in a bearing 347 suitably mounted on the dial-supporting casting 120 in position to align the latch 346 with a latching notch 348 cut into the rear surface of the arcuately shaped portion 341 of the carriage 334. When the carriage 334 is latched by the latch 346, its leading end will abut a stop member 329 (Fig. 8) fixed on the casting 120. The latch 346 is provided with a shank 349, which extends through the bearing 347 and is surrounded by a compression spring 350, which bears against a shoulder 351 on the latch 346 and against the shoulder 352 formed inside the bearing 347 normally to urge the latch to the left, as viewed in Figs. 8 and 9. The inwardly extending end of the latch has a slot 353 formed in it to receive a reduced rounded end 354 of a bell crank lever 355. The bell crank lever 355 is pivotally mounted on a pin 356 set into the bearing 347 and carries a cam roller 357 at its free end. The cam roller 357 is so positioned that, at spaced points about the periphery of the apparatus, it will engage camming blocks 358, which serve to rock the bell crank levers 355 counterclockwise about their pivot pins 356 for withdrawing the latch 346 from its associated latching notch 348 in the carriage 334. The camming blocks 358 are mounted upon a spider 359, which surrounds the tubular bearing member 100 and is fixed thereto, as shown most clearly in Fig. 4.

At the various operating stations of the apparatus, the latches 346 will be withdrawn due to the action of the cam block 358 on the cam rollers 357 and the carriage 334 may be held at the operating station, by mechanism to be described, for a sufficient length of time to perform the operations necessary on the cordage at the operating stations and, thereafter, the carriages 334 may be released and they will be moved back to their normal position to be latched therein by the latches 346 by means of a carriage return device (Fig. 4) comprising a door check mechanism 360 of any suitable type, of which there is provided one for each carriage 334. The door check mechanism 360 is mounted upon the dial-supporting casting 120, and has its operating arm 361 connected to the carriage 334 by means of a link 362 pivotally connected to the carriages by means of a pin 363 (Fig. 8) mounted in a projection 364 formed on the arcuately shaped portion 341 of the carriage 334. By means of this mechanism, a carriage 334, which is stopped in one of the operating stations of the apparatus, will remain stationary therein while the dial-supporting casting 120 continues to move counterclockwise until the necessary operations are performed on the cordage. Thereafter, the carriage 334, being released by mechanism under control of the apparatus in the operating station, will return to its normal position, as shown in Fig. 8, and will be latched in that position.

In their travel around the apparatus, the cordage-positioning plates 81 carry their cam rollers 230, 231, 232 and 233 in position to be engaged by cam members suitably supported upon a cam-supporting plate 370. As will be seen by reference to Fig. 3, the cam-supporting plate 370 extends substantially all the way around the apparatus, being broken away at the punch press station to permit the cordage-positioning plate 81 to be manipulated at that station and being apertured as shown at 371 and 372 at the braid-severing station 82 and tucking and inspection station 83, respectively. Attached to the plate 370 adjacent to its peripheral edge is a guard member 369 (Fig. 4) of U-shaped cross section, which extends over the ends of the plates 81. The cams which control the operations of the cam rollers 230, 231, 232 and 233 are designated by the numerals 376, 377, 378, 379 and 380, and their operative effect upon the elements of the cordage-positioning plate 81 will be described in connection with the description of operation of the mechanisms at the various operating stations of the apparatus.

The braid-severing station

As the portion of the cordage 75, which has been set into one of the cordage-positioning plates 81, is carried by the positioning plate into the braid-severing station 82, the cam rollers 230 and 231 will have been moved by the cam tracks 376 and 378 to the position shown in Figs. 3 and 6, thus to push the slidable clamp-supporting plates 220 and 221 to the right and left, respectively (Fig. 10). In this position, the clamping members carried by the plates 220 and 221 and the auxiliary clamping members 266 and 267, and 270 and 271 are as close together as possible, and these clamping members, as illustrated by the movable clamping members 223, 225, 266 and 267 will occupy the position shown in Fig. 10 to receive a length of cordage 75 between them. As the plate 81 moves into the braid-severing station 82, the cam rollers 232 and 233 will be moved apart while the cam rollers 230 and 231 remain in the positions just described. Movement of the cam rollers 232 and 233 away from each other will cause the main movable clamping jaws 223 and 225 and auxiliary clamping jaws 266 and 267 to move to a position where the cordage will be tightly clamped between them and their associated main fixed clamping jaws 222 and 224 and auxiliary fixed clamping jaws 270 and 271, respectively, as shown in Fig. 10.

As the cordage-positioning plate 81 moves into the braid-severing station 82, the latch 346 will be retracted from engagement with the latching notch 348 on the carriage 334 and the carriage will be momentarily stopped at this station. Just before the carriage reaches the position shown in Fig. 8 in the braid-severing station 82, a camming finger 381 carried on a bracket 382, in turn fixed to the carriage 334, will engage a trip finger 383 (Fig. 8) formed integrally with a latch 384 and will move the latch 384 out of engagement with the latching notch 385 in a spring-pressed plunger 386. The plunger 386 is freely slidable in an aperture 387 formed in bracket 388 attached to a bracket 374. The aperture 387 has a slot 389 formed in it for receiving the latch 384, which is pivoted on a pivot pin 390 set in the bracket 388 and which is urged to rock in a counterclockwise direction (Fig. 8) by a compression spring 391 seated in a socket 392 in the bracket 388 and engaging an extending portion 393 of the latch 384. The plunger 386 has a shank portion 394, to which a collar 395 is attached for forming an abutment to strike against a plate 397 attached to the bracket 388. Also surrounding the shank 394 of the plunger 386 is a compression spring 396, which is seated between the plate 397 and an end surface 398 of a socket 399 formed in the plunger whereby the plunger is normally urged to the right (Fig. 8) and the amount of its movement is limited by the collar-engaging plate 397.

Figure 9:
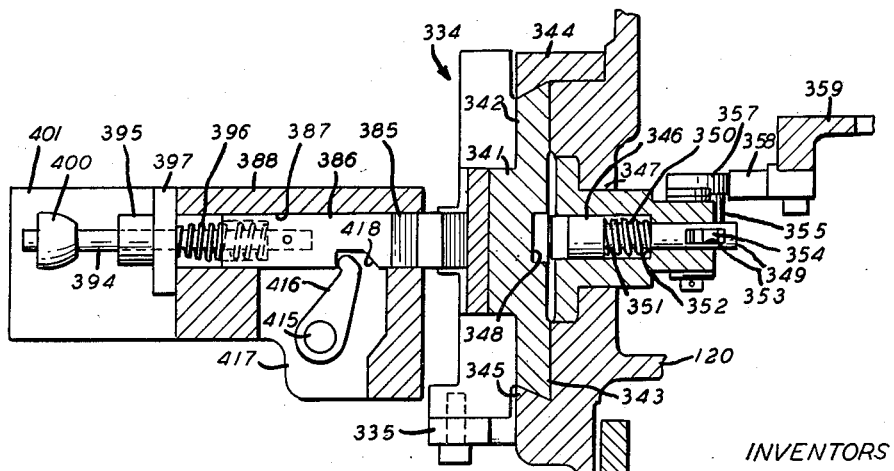
Fig. 9 is a fragmentary vertical section taken substantially along line 9—9 of Fig. 8.
Figure 13:
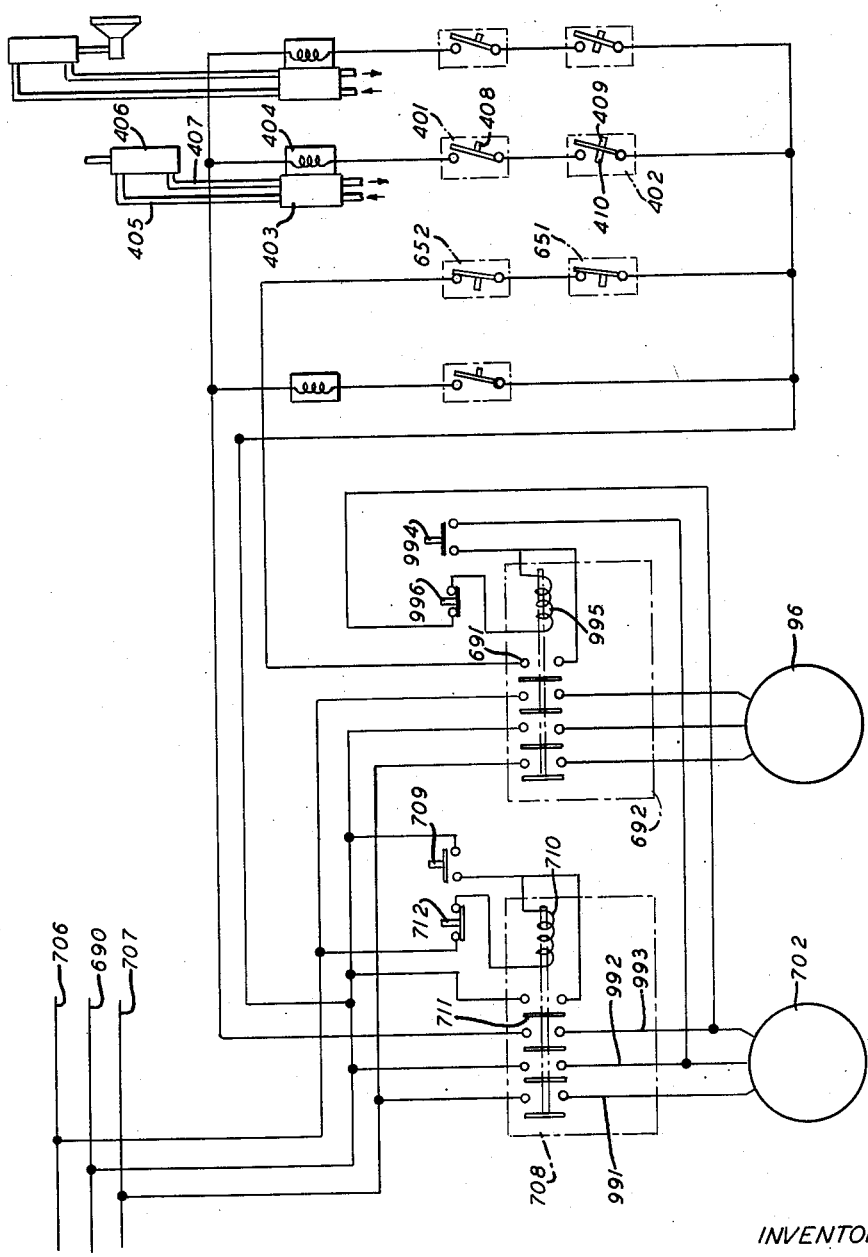
Fig. 13 is a circuit diagram of the electrical and fluid circuits which control the operation of the apparatus.

In addition to the collar 395, the shank 394 has a switch actuating cam 400 attached to it for actuating a switch 401 when the plunger is released by the latch 384 and moved to the position shown in Figs. 8 and 9. The switch 401, in cooperation with a switch 402, controls the flow of current to a reversing valve mechanism 403 (Fig. 13). The reversing valve mechanism 403 may be of any suitable type which, when its solenoid 404 is deenergized, will supply fluid under pressure through a pipe 405 to the upper end of a cylinder 406, and which, when energized, will reverse the fluid flow and direct fluid under pressure through the pipe 407 to the lower end of the cylinder 406. The switch 401 is a normally open type switch, which is spring-urged to its open position, and the switch 402 is of the type which will remain in either its open or closed position. Thus the switch 401 is provided with one actuator 408, whereas the switch 402 is provided with one actuator 409 and a reset button 410, which resets the switch to its normally open position. Prior to the arrival of the carriage 334 at the position shown in Fig. 8, the camming finger 381, in moving past the switch 402, will engage and actuate the switch actuator 409, thus to close the circuit through the switch 402 and, when the carriage 334 arrives in the position shown in Fig. 8, the switch actuator 408 will complete the circuit to the solenoid 404 by closing the switch 401, the switch 402 having been previously moved to its closed position.

When the switch 401 closes, as just described, fluid will be admitted to the lower end of the cylinder 406 (Fig. 6) to drive a piston rod 411 upwardly. The piston rod 411 carries a collar 412 on which there is formed a camming projection 413 adapted to cooperate with a cam 414 fixed to a shaft 415 journalled in the bracket 388. The shaft 415 (Fig. 9) also carries a plunger retracting member 416, which is mounted in a slot 417 in the bracket 388 and which normally carries its upper end in a notch 418 in the plunger 386. The shaft 415 also has a pin 419 (Fig. 8) fixed to it, to which one end of a contractile spring 420 is attached. The opposite end of the spring 420 is fixed to a pin 421 attached to a side wall of a knife housing 422. The spring 420 normally tends to hold the plunger retracting member 416 against the straight edge of the notch 418, as shown in Fig. 9, but will permit the retracting member 416 to be positively moved away from the notch 418 when the piston rod 411 moves upwardly. At this time, of course, the plunger 386 is in its inward or latching position, as shown in Figs. 8 and 9, and thus this movement of the cam 414, the shaft 415 and the plunger retracting member 416 are ineffective.

In addition to actuating the cam 414, the piston rod 411 serves to actuate a braid-cutting knife, designated generally by the numeral 423 (Figs. 6 and 7), and also serves to actuate a bell crank lever 424. The bell crank lever 424 is pivotally mounted on a stud shaft 425 secured to the underside of a top member 426 of the knife housing 422. Threaded into one arm of the bell crank lever 424 is a set screw 427, which may be locked in an adjusted position with respect to the bell crank lever by means of a lock nut 428, and which is adapted, when the bell crank lever is rocked about the shaft 425, to engage the reset button 410 of the switch 402 to reset the switch. Mounted on another arm of the bell crank lever 424 is a cam roller 429, which is positioned in the path of movement of a cam 430 suitably mounted upon the piston rod 411. The bell crank lever 424 is normally held in its inoperative position, as shown in Fig. 8, where it bears against a pin 431, by a contractile spring 432 attached to the bell crank lever and to a pin 433 mounted on the knife housing 422.

The knife 423 (Figs. 6, 7, 11 and 12), which is designed to be raised by the piston rod 411 and to cut the braided covering 79 on the cordage 75, is positioned in alignment with a central aperture 434 in a die bar 312 positioned between the clamp-supporting plates 220 and 221 on the cordage-positioning plate 81. In its upward movement the knife 423 passes through aligned apertures in the cam-supporting plate 370 and the top member 426 of the knife housing 422. The knife 423 is tapered and comprises a rounded tip 435 (Figs. 11 and 12) forming the apex of the knife. The tip 435 is designed to enter between the threads forming the braided covering 79 on the cordage 75 without damaging the separately insulated conductors 76, 77 and 78. The tip 435 also will serve, if necessary, to separate the conductors which, due to the fact that they are looped at the place where they extend from the cordage 75, will align themselves in such manner that a pair of blades 436 and 437 may cut the braided covering 79 without, however, damaging the insulation on the separately insulated conductors. The blade members 436 and 437 extend from the point where their cutting edges coincide with the tapered surface of the knife adjacent to the tip, to a point where a rounded head 438 joins the upper reduced end of the piston rod 411.

The two blades 436 and 437 are held between a retainer plate 439 (Figs. 11 and 12) and the body 440 of the knife, by means of flat head screws 441 which hold the plate on the body of the knife. The retainer member 439 is tapered at the upper end to engage a dovetail notch 443 formed in the body 440 of the knife, thus to retain the blades in the proper position where they extend only slightly beyond the body of the knife portion and the retainer plate. When fluid is admitted to the lower end of the cylinder 406 and the knife 423 is carried up through the cordage 75, the braided covering 79 will be cut at the point where the individual conductors 76, 77 and 78 extend out from it. Then the cordage may be arranged to have terminals attached to the individual conductors and to have the ends of the braided covering 79 enclosed in suitable retaining members in the form of a stay band on one end and an S-hook on the other end of the cords.

The just described operation of cutting the braided covering 79 comprises the first step in preparing the cords for the reception of the S-hooks, stay bands and terminals. The plate 81 carrying the cordage on which the braid has been severed at the point where the individual conductors extend from the cordage is next carried to the inspection and cutting station 83. As the piston rod 411 reaches the upper end of its travel, the cam 430 carried thereby will engage the cam roller 429 to rock the bell crank lever 424 about the shaft 425. As the bell crank lever 424 rocks about the shaft 425, the set screw 427 carried thereby will engage and actuate the reset button 410 of the switch 402, thus breaking the circuit to the solenoid 404 (Fig. 13). The reversing valve mechanism 403, no longer being held in its operated position, will return to its normal position and fluid will be supplied to the upper end of the cylinder 406 to cause the piston rod 411 to be retracted to the position shown in Fig. 6. In moving downwardly, the piston rod 411 will carry the camming projection 413 into engagement with the cam 414, thus to rock the shaft 415 counterclockwise. When the shaft 415 rocks counterclockwise, the plunger retracting member 416 will withdraw the plunger 386 from a socket 442, which it had entered after it was released by its latch 384. As soon as the plunger 386 is withdrawn from the socket 442, the carriage 334 will be released and the door check mechanism 360 will return the carriage 334 to position where the latch 346 will engage in the latching notch 348 and the carriage will be carried forward by the dial-supporting casting 120.

As the cordage-positioning plate 81 travels from the braid-severing station 82, the various parts of the cordage-positioning plate will be in the condition shown in Figs. 10 and 11, and prior to the latching of the plate 81 in the tucking and inspection station 83, the main clamping jaws and the auxiliary clamping jaws must be moved apart so that the tucking and inspection of the cordage may take place. It should be noted at this time that while the main clamping jaws 222, 223, 224 and 225 grip the cordage 75, the auxiliary clamping jaws 266, 267, 270 and 271 engage the cordage somewhat loosely and serve to position it over the die bar 312. Thus, when the sets of main clamping jaws, while still clamping the cordage between them, move apart, the auxiliary clamping jaws will stay in the position shown in Fig. 10 until the main clamping jaws approach the end of their travel longitudinally of the cordage-positioning plate 81, at which time the auxiliary clamping jaws will move apart. This moving apart of the auxiliary clamping jaws occurs between the braid-severing station 82 and the tucking and inspection station 83.

Tucking and inspection station

When the cordage-positioning plate 81 moves into the tucking and inspection station 83, the auxiliary clamping jaws 266, 267, 270 and 271 will be in such position as to permit the individual conductors 76, 77 and 78 to be readily tucked down through the cordage-positioning plate 81. At the tucking and inspection station, the loops in the individual conductors are tucked out of the way, and the positions of the conductors are inspected in the manner described fully in the aforementioned application Serial No. 730,512. The purpose of this tucking operation is to place the portions of the individually insulated conductors 76, 77 and 78 which will not be operated upon in the punch press station in such positions that they will be out of the way of the operating parts of the punch press. The inspection operation insures the proper positioning of the conductors before they reach the punch press station.

Punch press station

At the punch press station 84 of the apparatus, there is provided a suitable punch press, designated generally by the numeral 701 (Fig. 1). As illustrated generally in that figure, the punch press is provided with a driving motor 702, and, through a driving element 704, which may be either a chain drive or belt drive, the motor 702 imparts power to the punch press. The punch press motor 702 may be supplied with power from a suitable power source including the power lines 690, 706 and 707 (Fig. 13). Suitable control means are provided at the punch press station 84 to be operated by the cordage-positioning plate 81 in moving into the punch press station to cause the operation of the punch press. This mechanism may be a duplicate of that shown in connection with the braid-cutting station.

The punch press located at the punch press station, the elements of the general apparatus associated therewith, and the operation thereof are described in detail in the aforementioned application Serial No. 730,512 and some of the elements thereof are described and claimed in Hackbarth Patent 2,592,276, granted April 8, 1952. It suffices to say that strips of the terminals 91, strips of the S-hooks 92 and strips from which stay bands 95 may be formed are fed into the punch press. The terminals 90 are applied to the ends of the conductors 76, 77 and 78 and the S-hooks 93 and stay bands 94 are applied to the ends of the braided covering 79. At the same time, the unneeded ends of the conductors are severed at points adjacent to the terminals 91. The ends of finished cords are as shown in Fig. 14.

Operation

It is believed that a complete understanding of the invention may be had from the following brief description of the mode of operation of the apparatus:

In the operation of the apparatus, a supply of cordage 75, having been threaded into the feeding mechanism 80, and supplies of strips of terminals 91, strips of S-hooks 92, and a stay band strip 95 having been placed in the punch press 701, the apparatus will be in condition for operation, it being assumed that the various tool adjustments have been made to place the shearing and forming tools in the punch press in position to perform their operations effectively. After the apparatus has thus been supplied with the materials used in its operation, the apparatus may be started.

In order to insure that the punch press will function properly at all times that cordage-positioning plates 81 are in position therein to have the cordage held thereby equipped with S-hooks, stay bands and terminal members, the punch press motor 702 must be started first by closing the start switch 709 (Fig. 13). Momentary closure of the switch 709 will connect power from the line 690 to one side of the winding 710 of relay 708 and through a normally closed stop switch 712 back to the line 706. Power will thus be supplied to energize the relay 708, causing it to close its contacts. As soon as relay 708 closes its contacts, power will be supplied from the lines 707, 690 and 706 to leads 991, 992 and 993 extending from the relay 708 to the motor 702. As soon as the relay 708 pulls up, it will lock operated over its locking contacts 711.

The punch press motor 702 having been put in operation, the main driving motor 96 may be started by momentarily closing a start switch 994. The closure of start switch 994 will connect lead 992, now connected to the power source, to one side of the winding 995 of relay 692. The other side of the winding 995 is connected to lead 993 through a normally closed stop switch 996 and thus, when the punch press motor 702 is supplied with power, a circuit may be completed to initiate the operation of the main driving motor 96. When relay 692 pulls up, it will lock operated over its contact 691 and through the normally closed switches 652 and 651 back to line 690. In this manner, motor 96 will continue to be supplied with power until stop switch 712, stop switch 996, or either of switches 651 or 652 is operated.

As the apparatus starts in operation, due to the fact that motor 96 is supplying power to the main shaft 104 (Fig. 3), power for driving the feeding mechanism 80 will be transmitted from the shaft 104 and interconnected gear to drive shafts 108, 111 and 114, thus to supply power to drive the ring gear 119. As the ring gear 119 rotates, it will carry the dial-supporting casing 120 with it around the tubular bearing member 100 (Fig. 4). As the ring gear 119 rotates, it will, through pinion 135, transmit power to the feed mechanism 80 by means of which cordage will be fed onto the platform 86, from which the operator may remove a length of cordage equal to the distance between the places on the cordage where conductors are looped through the braid 79.

An operator positioned adjacent to the feeding mechanism 80 will place the cordage 75 on the adjacent moving cordage-positioning plate 81, aligning the cordage in such a manner that the conductor 78 will be extending between the auxiliary movable clamping members 266 and 267, the conductor 76 will be extending between the auxiliary fixed clamping members 270 and 271 and the conductor 77 will be extending vertically upwardly at the juncture of the clamping members, as viewed in Figs. 10 and 11. As the cordage-positioning plate 81 arrives at the feeding mechanism 80, a completed cord having been removed from it after it left the punch press station, it will have its cam rollers 231, 232 and 233 moved to their innermost positions by the cams 379 and 380, thus to move the clamp-supporting plates 220 and 221 as near to the die bar 312 as they can be moved. When the clamp-supporting plates 220 and 221 are at their closest position, the main clamping members 222, 223, 224 and 225 will be as closely adjacent as possible and in position to receive a length of cordage 75.

Just as the cordage-positioning plate 81 enters the position where cordage may be placed on it, the cam 377 will become effective to push the cam rollers 232 and 233 apart slightly and at the same time the cams 376 and 378 will prevent the clamp-supporting plates 220 and 221 from moving apart. In this manner, the plates 220 and 221, being held against movement longitudinally of the cordage-positioning plate 81, the cam rollers 232 and 233, in being moved apart slightly, will cause the main movable clamping members 223 and 225 to move toward the main fixed clamping members 222 and 224 and will carry the auxiliary movable clamping members 266 and 267 toward the auxiliary fixed clamping members 270 and 271. Thereafter, when a length of cordage is placed between the clamping jaws, it will remain in the position in which it is placed, although it is not tightly clamped by the clamping members. After the operator has properly located the cordage 75 so that the loops of conductors 76 and 78 are positioned as just described hereinbefore, the operator may wrap the cordage 75 as shown in Fig. 1 with the cordage carried by the clips 316 and 317, and held by the pins 318, 319, 997, 998 and 999.

As the cordage-positioning plate 81, on which a length of cordage has been positioned, continues to travel, the cams 232 and 233 will be moved farther apart by the cam 377 as the cordage-positioning plate 81 enters the braid-severing station 82, as seen most clearly in Fig. 3. When the cam rollers 232 and 233 move apart under the action of cam 377 at the braid-severing station 82, the cam rollers 230 and 231 will be held against movement longitudinally of the cordage-positioning plate by cams 376 and 378. Thus, the main movable clamping members 223 and 225 and the auxiliary movable clamping members 266 and 267 will be moved toward their associated fixed clamping members. Accordingly, the main clamping members 222, 223, 224, and 225 will tightly grip the cordage 75 between them, and the auxiliary clamping members 266, 267, 270 and 271 will lightly engage the cordage. The cordage as thus positioned will extend over the die bar 312.

As the cordage-positioning plate 81 enters the braid-severing station 82, camming finger 381 on the carriage 334 will engage the trip finger 383 to release the plunger 386. The plunger 386 will move forward onto the surface of the bracket 382 at approximately the same time that the cam roller 357 rolls up the surface of operating cam 358 (Fig. 8) to withdraw spring-pressed latch 346 from latching notch 348. The carriage 334 will thus continue to move with the dial-supporting casting 120 until the plunger 386 is in registry with the socket 442, at which time the latch 346 will be retracted from the notch 348, the plunger 386 dropping into the socket 442 will hold the carriage 334 stationary for a short time in the braid-severing station 82.

The plunger 386, in moving into the socket 442, will, through the cam 400, close the switch 401. Since the switch 402 had previously been closed by the engagement of camming finger 381 with actuator 409, power will be supplied to energize the solenoid 404 over a circuit (Fig. 13) from the line 706 through the solenoid 404 and the switches 401 and 402, back to the line 699. When the solenoid 404 is energized, the reversing valve mechanism 403 will be operated and fluid under pressure will be supplied to the lower end of the cylinder 406. When fluid under pressure is supplied to the lower end of the cylinder 406, the piston rod 411 (Fig. 20) will be moved upwardly to carry the braid-cutting knife 423 up through the die bar 312. When the knife 423 moves upwardly through the die bar 312, its rounded tip 435, as shown most clearly in Fig. 11, will engage the braided covering 79 on the cordage 75 at the point where the looped conductors 76, 77 and 78 extend out from the cordage. The rounded tip 435 of the knife 423 will enter between the servings of the braided covering 79 and will push the conductors 76, 77 and 78 out of its path. As the knife 423 continues to move upwardly, its blade members 436 and 437 will cut the braided covering 79 without damaging the insulation on the conductors 76, 77 and 78.

In moving upwardly, the piston rod 411 rocks the shaft 415 clockwise (Figs. 6 and 9) due to the engagement of the camming projection 413 with the cam 414. This operation of the shaft 415 effects no useful purpose. However, as the piston rod 411 continues to move upwardly, the cam 430 will engage the cam roller 429 and will rock the bell crank lever 424 clockwise, as viewed in Fig. 8, thereby to operate the reset button 410 of the switch 402. This breaks the circuit to the solenoid 404 and permits the reversing valve 403 to return to its normal position, where it will direct fluid under pressure to the upper end of the cylinder 406.

Fluid under pressure being supplied to the upper end of the cylinder 406, the piston rod 411 will be moved downwardly and, in moving downwardly, the camming projection 413 will again engage and actuate the cam 414 to rock the shaft 415 counterclockwise (Figs. 6 and 9). When the shaft 415 is rocked counterclockwise, the plunger retracting member 416 will be rocked counterclockwise to retract the plunger 386 and move it to its inoperative position, thus opening the switch 401 and restoring the braid-severing mechanism to normal position. When the plunger 386 is retracted, it will release the carriage 334 and, thereupon, the door check mechanism 360 will be effective to return the carriage 334 to its normal position with respect to the dial-supporting casting 120. At the time that the door check mechanism 360 becomes effective, the cam roller 357 will move off of the cam 358. When the door check mechanism returns the carriage 334 to normal position, the latch 346 will lock the carriage to the casting 120, in position to be carried around to the tucking and inspection station 83.

As the carriage 334 continues to move around the tubular bearing member 100, it will carry the cordage-positioning plate 81 into the tucking and inspection station 83. In travelling from the braid-severing station to the tucking and inspection station 83, the clamp-supporting plates 220 and 221 are moved apart by the cam 377 (Fig. 3) acting on rollers 232 and 233 and pushing the rollers apart. This movement is possible because the cam tracks 376 and 378 terminate short of this position. In this manner, the grip of the main clamping members 222, 223, 224 and 225 on the cordage is not released since the plates are pushed apart only by the action of the cam rollers 232 and 233. In thus moving apart, the plates 220 and 221 will cause the various clamping members to move to positions where the conductors 76, 77 and 78 are separated into loops and the portions of the cordage 75 with the braided covering 79 thereon are in position to have S-hooks and stay bands attached to them in the punch press station 84 after the loops in the conductors 76, 77 and 78 have been tucked down through the cordage-positioning plate.

The cordage-positioning plate 81 and the carriage 334 next enter the tucking and inspection station 93. In the station 83, the individual conductors 76, 77 and 78 are positioned for the receipt of terminal members 90 in the punch press station 84, and the positions of the conductors are checked. If the conductors are positioned properly, the operation proceeds, but if the conductors are not properly aligned, the main drive motor of the apparatus is stopped by a control circuit associated with the inspection elements. After the conductors 76, 77 and 78 have been tucked down through the cordage-positioning plate 81 and inspected at the tucking and inspection station 83, the carriage 334 carrying the plate 81 will move into the punch press station 84. At the punch press station, the terminals, S-hooks and stay bands will be applied, and the ends of the conductors will be severed.

The cordage-positioning plate 81 then will be moved out of the punch press station 84 to a position where the cam rollers 230, 231, 232 and 233 will engage the cams 379 and 380 (Fig. 3). The cam rollers 230 and 232 will engage the cam 380 and will be spread apart by the forward end of this cam. Similarly, the cam rollers 231 and 233 will engage the cam 379 and will be spread apart by the forward end of this cam, thus to open the sets of clamping jaws on the cordage-positioning plate 81 sufficiently to permit the removal of a completed cord therefrom. As the carriage 334 carries the cordage-positioning plate 81 into association with the feeding mechanism 80, the clamp-supporting plates 220 and 221 will be moved toward each other by the action of the cam rollers 232 and 233 on the cams 380 and 379, respectively, to prepare the cordage-positioning plate to receive a new length of cordage. At the unloading station 85, through which the carriage 334 will be moved at the time when the just-described operations take place, any suitable means may be provided for taking the completed cords from the cordage-positioning plate 81, or the cords may be removed by an operator.

While the previous description of operation of the apparatus has related primarily to a single cordage-positioning plate 81, it will be understood that six of the plates 81 and their associated carriages 334 are provided in the apparatus. While an operator is loading the cordage 75 onto one of the plates 81, there will be a plate 81 at the braid-severing station 82, one at the tucking and inspection station 83, one at the punch press station 84, one at the unloading station 85 and one at an idle position between the braid-severing station 82 and the tucking and inspection station 83.

What is claimed is:

1. Severing apparatus for use in making electrical cords from continuous cordage including a plurality of conductors with a continuous covering thereover and having the conductors thrown in loops through and out of the covering at spaced points along the cordage, which comprises a turret rotatable about a predetermined axis, means for continuously rotating the turret in a predetermined direction, a carrier mounted slidably on the turret for carrying a portion of such cordage, means for urging the carrier toward a predetermined position on the turret, a cutter positioned adjacent to a predetermined point in a path along which the cordage is carried by the carrier, means for temporarily holding the carrier stationary adjacent to the cutter, means for moving the cutter into and out of engagement with the cordage on the temporarily held carrier, electromagnetic means for actuating the cutter-moving means, said electromagnetic means serving when energized to actuate the cutter-moving means to move the cutter into engagement with the cordage and when deenergized to actuate the cutter-moving means to move the mechanism out of engagement with the cordage, a control switch in series with the electromagnetic means, means carried by the turret for closing the control switch as the carrier approaches the cutter, and means for releasing the carrier-holding means at the completion of the cutting operation whereupon the carrier-urging means returns the carrier to its predetermined position on the turret.

2. Severing apparatus for use in making electrical cords from continuous cordage including a plurality of conductors with a continuous covering thereover and having the conductors thrown in loops through and out of the covering at spaced points along the cordage, which comprises a turret rotatable about a predetermined axis, means for continuously rotating the turret in a predetermined direction, a carrier mounted slidably on the turret for carrying a portion of such cordage, means for urging the carrier toward a predetermined position on the turret, a reciprocable cutter located adjacent to a predetermined position in a path along which the cordage is carried by the carrier, means responsive to movement of the turret for temporarily holding the carrier stationary at the cutter position, means for moving the cutter into and out of engagement with the cordage on the temporarily held carrier, electromagnetic means for actuating the cutter-moving means, said electromagnetic means serving when energized to actuate the cutter-moving means to move the cutter into engagement with the cordage and when deenergized to actuate the cutter-moving means to move the cutter out of engagement with the cordage, a switch for energizing the electromagnetic means, a reset switch in series with the electromagnetic means, means carried by the turret for closing the energizing switch as the carrier approaches the cutter position, means operable by the cutter for opening the reset switch to cause the cutter to return to its normal position, and means for releasing the carrier-holding means at the completion of the cutting operation whereupon the carrier-urging means returns the carrier to its predetermined position on the turret.

3. Severing apparatus for use in making electric cords from continuous cordage including a plurality of conductors having a continuous covering thereover and having the conductors thereof extending out of the covering at spaced points along the cordage, which comprises a turret rotatable about a predetermined axis, means for continuously rotating the turret in predetermined direction, a carrier mounted slidably on the turret for carrying a portion of such cordage, means for urging the carrier toward a predetermined position on the turret, means for gripping such cordage at opposite sides of one of such portions, an elongated cutter having a blunt end and knives projecting from the sides thereof, said cutter being positioned adjacent to a predetermined point in a path along which the cordage is carried by the carrier, means for temporarily holding the carrier stationary adjacent to the cutter, pneumatic means for moving the cutter into and out of engagement with the gripped cordage on the temporarily held carrier to sever the covering, electromagnetic means for controlling the pneumatic cutter-moving means, said electromagnetic means serving when energized to actuate the cutter-moving means to move the cutter into engagement with the cordage and when deenergized to actuate the cutter-moving means to move the cutter out of engagement with the cordage, switch means associated with the electromagnetic means to energize and deenergize said electromagnetic means, means carried by the turret for closing the switch as the carrier approaches the cutter, means actuated by movement of the cutter for subsequently opening the switch, and means for releasing the carrier-holding means at the completion of the cutting operation whereupon the carrier-urging means returns the carrier to its predetermined position on the turret.

4. Severing apparatus for use in making electrical cords from continuous cordage including a plurality of conductors with a continuous covering thereover and having the conductors thrown through and extending out of the covering at spaced points along the cordage, which comprises a base, a turret rotatably mounted on the base, means for rotating the turret, a carrier slidably mounted on the turret upon which may be positioned a portion of the cordage where the conductors extend out of the covering, means for normally retaining the carrier fixed to the turret for rotation therewith, means at one position on the base in the path of travel of the carrier for successively rendering said carrier-retaining means inoperative as the carrier reaches said position, means on said base at said position for temporarily stopping movement of the carrier while the turret continues to move, means at said position operative when the carrier reaches that position and is stationary for cutting the covering on the cordage at the point where the conductors extend therefrom, means actuated by the cutter means for releasing the carrier-stopping means at the completion of the cutting operation, and means for returning the carrier to its normal fixed position on the turret upon the release of said carrier-stopping means.

5. Severing apparatus for use in making electrical cords from continuous cordage including a plurality of conductors with a continuous covering thereover and having the conductors thrown through and extending out of the covering at spaced points along the cordage, which comprises a base, a turret rotatably mounted on the base, means for rotating the turret, a carrier slidably mounted on the turret upon which may be positioned a portion of the cordage where the conductors extend out of the covering, means for normally retaining the carrier fixed to the turret at a predetermined position thereon for rotation therewith, door check-type means on the turret for urging the carrier toward said predetermined position on the turret, means at one position on the base in the path of travel of the carrier for successively rendering said carrier-retaining means inoperative as the carrier reaches said position, means on said base at said position for temporarily stopping movement of the carrier while the turret continues to move, means at said position operative when the carrier reaches that position and is stationary for cutting the covering on the cordage at the point where the conductors extend therefrom, and means actuated by the cutter means for releasing the carrier-stopping means at the completion of the cutting operation whereupon the door check-type means returns the carrier to its normal predetermined position on the turret.

6. In apparatus for making electrical cords from continuous cordage including a plurality of conductors with a continuous covering thereover and having the conductors thrown through and extending out of the covering at spaced points along the cordage, said apparatus having a base, a turret rotatably mounted on the base and means for rotating the turret, the improvement which comprises a plurality of carriers slidably mounted on the turret upon which the successive portions of the cordage where the conductors extend out of the covering may be positioned, means for normally retaining the carriers fixed to the turret at predetermined positions thereon for rotation therewith, yieldable means for urging the carriers toward said positions on the turret, means on the base at one position in the path of travel of the carriers for rendering said carrier-retaining means inoperative and for temporarily stopping movement of the successive carriers while the turret continues to move, means at said position for cutting the covering on the cordage at the point where the conductors extend therefrom while the carriers are stationary, means actuated by the cutter means for releasing the carriers at the completion of the cutting operation and for returning the carriers to their initial positions on the turret, and means on said base controlled by movement of the turret for actuating the cutting means as the carriers are successively stopped thereat.

7. In apparatus for making electrical cords from continuous cordage including a plurality of conductors with a continuous covering thereover and having the conductors thrown through and extending out of the covering at spaced points along the cordage, the improvement which comprises a base, a turret rotatably mounted on the base, means for rotating the turret, a carrier slidably mounted on the turret upon which may be positioned a portion of the cordage where the conductors extend out of the covering, means for normally retaining the carrier fixed to the turret for rotation therewith, means at one position on the base in the path of travel of the carrier for successively rendering said carrier-retaining means inoperative as the carrier reaches said position, means on said base at said position for temporarily stopping movement of the carrier while the turret continues to move, means at said position operative when the carrier reaches that position and is stationary for successively engaging and disengaging the cordage at the point where the conductors extend therefrom, means actuated by said cordage-engaging and disengaging means when said means disengages the cordage for releasing the carrier-stopping means, and means for returning the carrier to its normal fixed position on the turret upon the release of the carrier-stopping means.

8. In apparatus for making electrical cords from continuous cordage including a plurality of conductors with a continuous covering thereover and having the conductors thrown through and extending out of the covering at spaced points along the cordage, the improvement which comprises a base, a turret rotatably mounted on the base, means for rotating the turret, a carrier slidably mounted on the turret upon which may be positioned a portion of the cordage where the conductors extend out of the covering, means for normally retaining the carrier fixed to the turret at a predetermined position thereon for rotation therewith, door check-type means on the turret for urging the carrier toward said predetermined position on the turret, means at one position on the base in the path of travel of the carrier for successively rendering said carrier-retaining means inoperative as the carrier reaches said position, means on said base at said position for temporarily stopping movement of the carrier while the turret continues to move, means at said position operative when the carrier reaches that position and is stationary for successively engaging and disengaging the cordage, and means actuated by the cordage-engaging and disengaging means when said means disengages the cordage for releasing the carrier-stopping means whereupon the door check-type means returns the carrier to its normal predetermined position on the turret.

9. In apparatus for making electrical cords from continuous cordage including a plurality of conductors with a continuous covering thereover and having the conductors thrown through and extending out of the covering at spaced points along the cordage, said apparatus having a base, a turret rotatably mounted on the base and means for rotating the turret, the improvement which comprises a plurality of carriers slidably mounted on the turret upon which the successive portions of the cordage where the conductors extend out of the covering may be positioned, means for normally retaining the carriers fixed to the turret at predetermined positions thereon for rotation therewith, yieldable means for urging the carriers toward said positions on the turret, means on the base at one position in the path of travel of the carriers for rendering said carrier-retaining means inoperative and for temporarily stopping movement of the successive carriers while the turret continues to move, means at said position for successively engaging and disengaging the cordage while the carriers are stationary, means on said base controlled by movement of the turret for actuating the cordage-engaging and disengaging means as the carriers are successively stopped thereat, and means actuated by the cordage-engaging and disengaging means when said means disengages the cordage for releasing the carriers whereupon said yieldable means returns the carriers to their predetermined fixed positions on the turret.

10. In apparatus for making electrical cords from continuous cordage including a plurality of conductors with a continuous covering thereover and having the conductors thrown in loops through and out of the covering at spaced points along the cordage, the improvement which comprises a turret rotatable about a predetermined axis, means for continuously rotating the turret in a predetermined direction, a carrier mounted slidably on the turret for carrying a portion of such cordage, means for normally retaining the carrier fixed to the turret for positive rotation therewith, a cordage-engaging and disengaging mechanism positioned adjacent to a predetermined point in a path along which the cordage is carried by the carrier, means for temporarily releasing the carrier from the turret and for holding the carrier stationary adjacent to the cordage-engaging and disengaging mechanism, pneumatic means for moving said mechanism into and out of engagement with the cordage on the stationary carrier, electromagnetic means for controlling the pneumatic means, said electromagnetic means serving when energized to cause the cordage-engaging and disengaging mechanism to move into engagement with the cordage and when deenergized to cause said mechanism to move out of engagement with the cordage, a switch in series with the electromagnetic means, means carried by the turret for closing the switch as the carrier approaches the cordage-engaging and disengaging mechanism, means operable by the cordage-engaging and disengaging mechanism after said mechanism has moved into engagement with the cordage for subsequently opening the switch to deenergize the electromagnetic means, means for releasing the carrier-holding means when the cordage-engaging and disengaging mechanism disengages the cordage, and means for returning the carrier to its normal fixed position on the turret upon the release of said carrier-holding means.

References Cited in the file of this patent

UNITED STATES PATENTS

| | | |
|---|---|---|
| 10,986 | Harraday | May 30, 1854 |
| 947,724 | Wood | Jan. 25, 1910 |
| 1,646,258 | Raus et al. | Oct. 18, 1927 |
| 1,708,756 | Fagan et al. | Apr. 9, 1929 |
| 1,836,500 | Poole | Dec. 15, 1931 |
| 1,883,025 | Smith | Oct. 18, 1932 |
| 1,925,884 | Steele | Sept. 5, 1933 |
| 2,087,728 | Boriski | July 20, 1937 |
| 2,145,405 | Schermerhorn | Jan. 31, 1939 |
| 2,191,536 | Michel | Feb. 27, 1940 |
| 2,613,427 | Adams et al. | Oct. 14, 1952 |